United States Patent
Ishino (10) Patent No.: US 10,632,794 B2
(45) Date of Patent: Apr. 28, 2020

(54) TIRE

(71) Applicant: SUMITOMO RUBBER INDUSTRIES, LTD., Kobe-shi (JP)

(72) Inventor: Hiroyuki Ishino, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 381 days.

(21) Appl. No.: 15/492,453

(22) Filed: Apr. 20, 2017

(65) Prior Publication Data

US 2017/0368887 A1    Dec. 28, 2017

(30) Foreign Application Priority Data

Jun. 27, 2016  (JP) ................................. 2016-126864

(51) Int. Cl.
| | |
|---|---|
| *B60C 11/11* | (2006.01) |
| *B60C 11/16* | (2006.01) |
| *B60C 11/03* | (2006.01) |
| *B60C 11/14* | (2006.01) |

(52) U.S. Cl.
CPC ........... *B60C 11/11* (2013.01); *B60C 11/0302* (2013.01); *B60C 11/0304* (2013.01); *B60C 11/14* (2013.01); *B60C 11/16* (2013.01); *B60C 2011/0365* (2013.01); *B60C 2011/0376* (2013.01)

(58) Field of Classification Search
CPC .................................................. B60C 11/0302
USPC .................................................. D12/559, 564
See application file for complete search history.

(56) References Cited

U.S. PATENT DOCUMENTS

| | | | |
|---|---|---|---|
| D685,723 S | * | 7/2013 | Shin ............................. D12/545 |
| 2015/0191050 A1 | * | 7/2015 | Matsumoto ............. B60C 11/04 |
| | | | 152/209.25 |
| 2016/0114629 A1 | * | 4/2016 | Hashimoto ......... B60C 11/0332 |
| | | | 152/209.25 |
| 2017/0021674 A1 | | 1/2017 | Abe et al. |

FOREIGN PATENT DOCUMENTS

| | | |
|---|---|---|
| JP | 2015-123937 A | 7/2015 |
| JP | 2016-016694 A | 2/2016 |
| WO | WO 2015/093390 A1 | 6/2015 |

OTHER PUBLICATIONS

Extended European Search Report dated Oct. 11, 2017 in European Patent Application No. 17166750.4.

* cited by examiner

*Primary Examiner* — Steven D Maki
(74) *Attorney, Agent, or Firm* — Oblon, McClelland, Maier & Neustadt, L.L.P.

(57) ABSTRACT

A tire has a tread having a first tread edge, a second tread edge on the opposite side, and multiple inclined main grooves formed such that each inclined main groove is obliquely extending from one of the first and second tread edges toward a tire equator and is terminated without reaching the other one of the first and second tread edges. The inclined main grooves are formed such that each of the inclined main grooves includes a tire axial direction outer side portion obliquely extending in an inclined direction, a tire axial direction inner side portion inclining in the inclined direction, and a middle portion formed between the tire axial direction outer side portion and the tire axial direction inner side portion and inclining in the opposite inclined direction with respect to the inclined direction of the tire axial direction outer side portion and tire axial direction inner side portion.

20 Claims, 6 Drawing Sheets

TIRE

CROSS-REFERENCE TO RELATED APPLICATIONS

The present application is based upon and claims the benefit of priority to Japanese Patent Application No. 2016-126864, filed Jun. 27, 2016, the entire contents of which are incorporated herein by reference.

BACKGROUND OF THE INVENTION

Field of the Invention

The present invention relates to a tire having excellent on-snow performance.

Description of Background Art

Japanese Patent Laid-Open Publication No. 2016-016694 describes a tire in which inclined main grooves are provided. The entire contents of this publication are incorporated herein by reference.

SUMMARY OF THE INVENTION

According to one aspect of the present invention, a tire has a tread having a first tread edge, a second tread edge on the opposite side with respect to the first tread edge, and multiple inclined main grooves formed such that each of the inclined main grooves is obliquely extending from one of the first tread edge and the second tread edge toward a tire equator and terminated without reaching the other one of the first tread edge and the second tread edge. The inclined main grooves are formed such that each of the inclined main grooves includes a tire axial direction outer side portion obliquely extending in an inclined direction, a tire axial direction inner side portion inclining in the inclined direction, and a middle portion formed between the tire axial direction outer side portion and the tire axial direction inner side portion and inclining in the opposite inclined direction with respect to the inclined direction of the tire axial direction outer side portion and tire axial direction inner side portion.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

The embodiments will now be described with reference to the accompanying drawings, wherein like reference numerals designate corresponding or identical elements throughout the various drawings.

Figure 1:
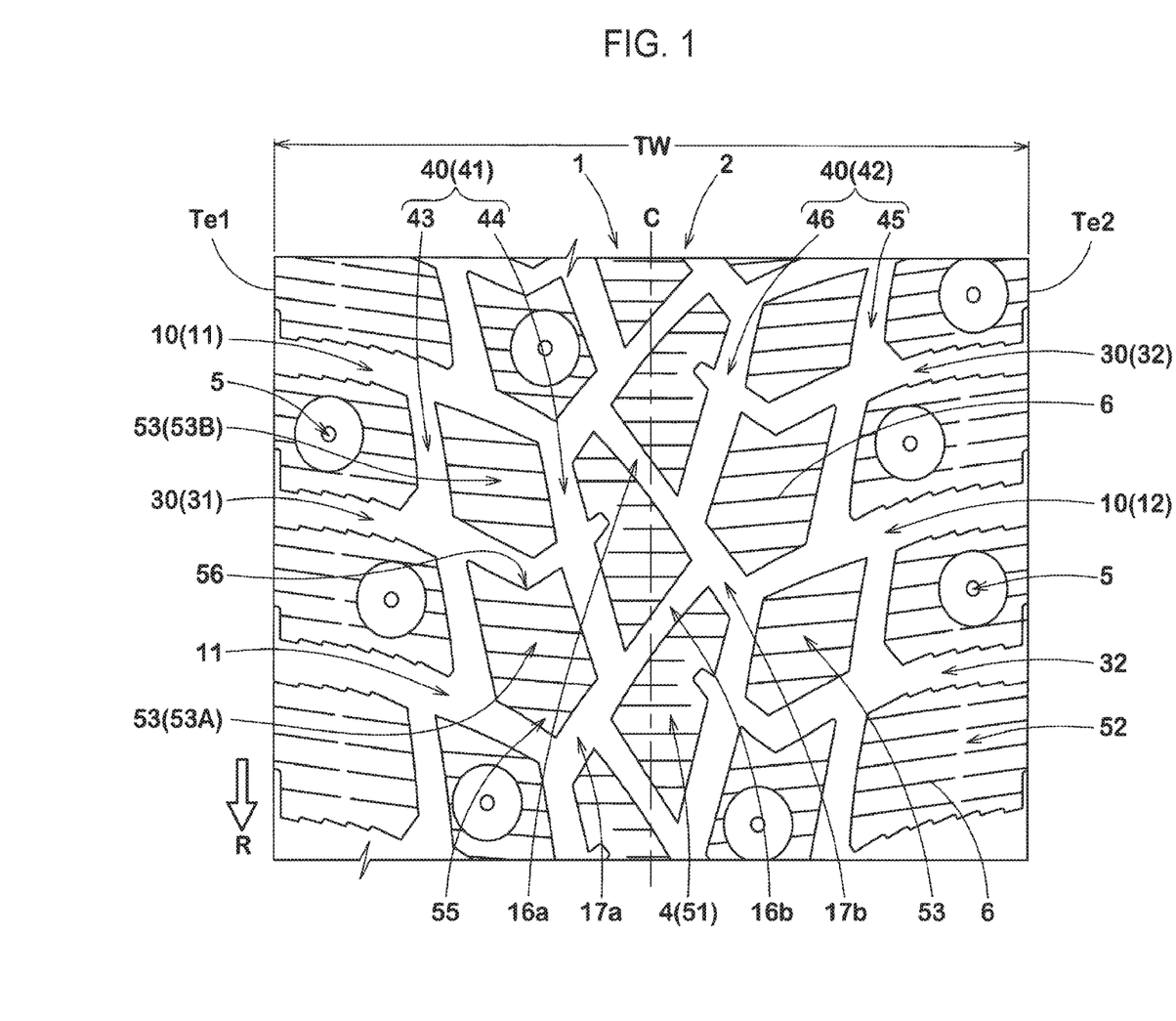
FIG. 1 is a developed view of a tread part of a tire according to an embodiment of the present invention.

FIG. 1 is a developed view of a tread part 2 of a tire 1 illustrating an embodiment of the present invention. The tire 1 of the present embodiment can be used, for example, for various tires such as a pneumatic tire for a passenger car or a vehicle for a heavy load, and for a non-pneumatic tire that is not filled with pressurized air. The tire 1 of the present embodiment is, for example, a pneumatic tire, and is suitably used as a winter tire for a passenger car.

As illustrated in FIG. 1, the tire 1 has the tread part 2 demarcated by a first tread edge (Te1) and a second tread edge (Te2). In FIG. 1, a left side is the first tread edge (Te1), and a right side is the second tread edge (Te2).

In the case of a pneumatic tire, the tread edges (Te1, Te2) are respectively tire axial direction outermost side ground contact positions when the tire 1 in a normal state is loaded with a normal load and is grounded on a flat surface at a camber angle of 0 degree. The term "normal state" refers to a no-load state in which the tire is mounted to a normal rim and is filled with air at a normal internal pressure. In the present specification, unless otherwise specified, values of dimensions and the like of the parts of the tire are values measured in the normal state.

The term "normal rim" refers to a rim for which standards are set for each tire in a system of standards that includes standards on which the tire is based. For example, the term "normal rim" refers to a "Standard Rim" in the JATMA standards, a "Design Rim" in the TRA standards, or a "Measuring Rim" in the ETRTO standards.

The term "normal internal pressure" refers to an air pressure for which standards are set for each tire in a system of standards that includes the standards on which the tire is based, and refers to a "Highest Air Pressure" in the JATMA standards, a maximum value published in the table "Tire Load Limits at Various Cold Inflation Pressures" in the TRA standards, or an "Inflation Pressure" in the ETRTO standards.

The term "normal load" refers to a load for which standards are set for each tire in a system of standards that includes the standards on which the tire is based, and refers to a "Maximum Load Capacity" in the JATMA standards, a maximum value published in the table "Tire Load Limits at Various Cold Inflation Pressures" in the TRA standards, or a "Load Capacity" in the ETRTO standards.

The tread part 2 of the present embodiment has, for example, a directional pattern in which a rotation direction (R) is specified. The rotation direction (R) is displayed, for example, using a character or a symbol on a side wall part (not shown in the drawings).

Multiple inclined main grooves 10 are provided in the tread part 2. The inclined main grooves 10 each obliquely extend from one of the first tread edge (Te1) and the second tread edge (Te2) toward a tire equator (C) side and are each terminated without reaching the other tread edge of the first tread edge (Te1) or the second tread edge (Te2).

The inclined main grooves 10 of the present embodiment include, for example, first inclined main grooves 11 and second inclined main grooves 12. The first inclined main grooves 11 each obliquely extend from the first tread edge (Te1) toward the tire equator (C) side and are each terminated without reaching the second tread edge (Te2). The second inclined main grooves 12 each obliquely extend from the second tread edge (Te2) toward the tire equator (C) side and are each terminated without reaching the first tread edge (Te1).

The first inclined main grooves 11 and the second inclined main grooves 12 of the present embodiment have, for example, substantially line-symmetrical contours with respect to the tire equator (C).

Figure 2:
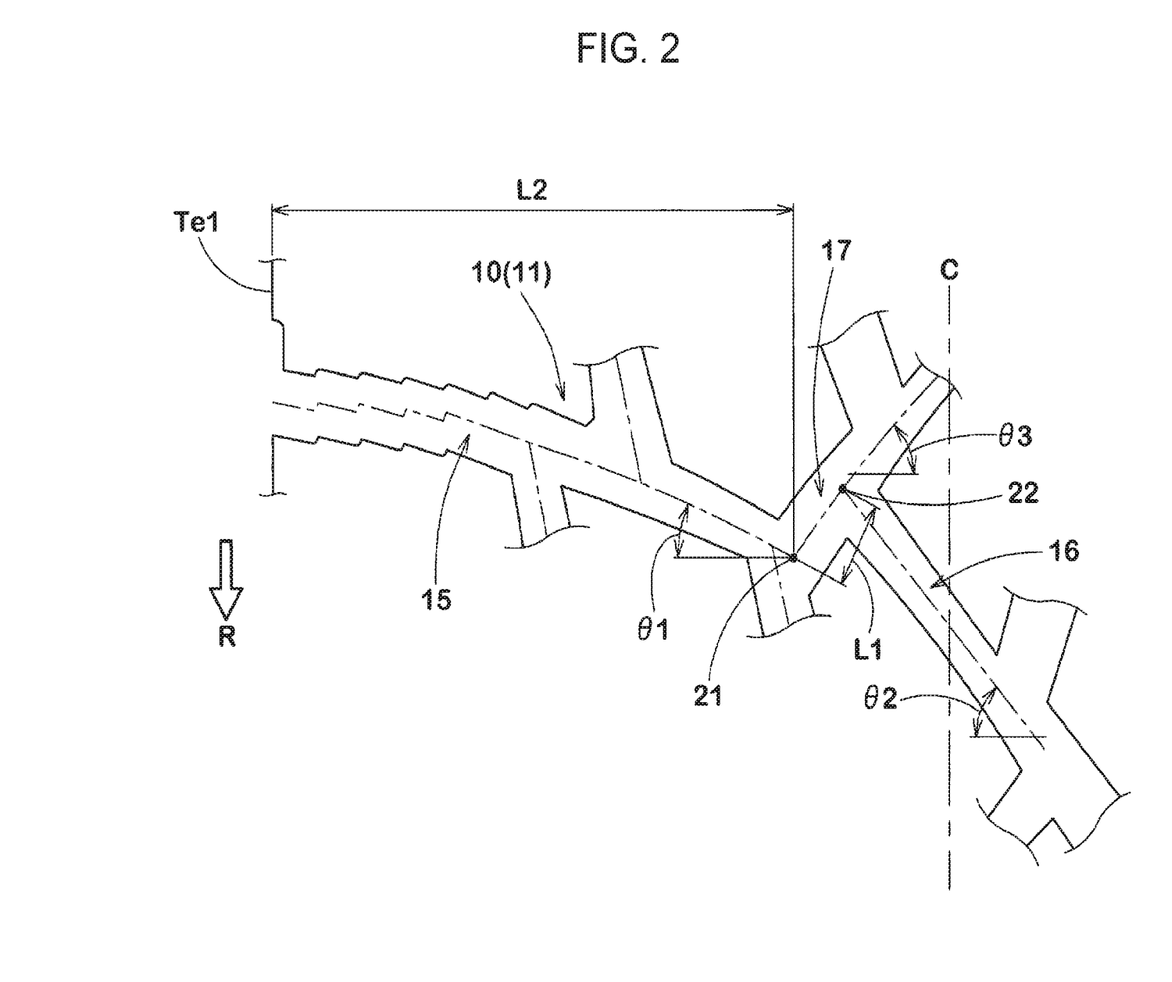
FIG. 2 is an enlarged view of a contour of a first inclined main groove of FIG. 1.

In FIG. 2, as a drawing for describing a structure of each of the inclined main grooves 10, an enlarged view of a contour of a first inclined main groove 11 is illustrated. The second inclined main grooves 12 can be understood in the same way by replacing first tread edge (Te1) with the second tread edge (Te2). As illustrated in FIG. 2, the inclined main grooves 10 each include an outer side portion 15, an inner side portion 16 and a middle portion 17.

The outer side portion 15 obliquely extends from the first tread edge (Te1). The outer side portion 15 of the present embodiment is inclined toward the rotation direction (R) side from the first tread edge (Te1) toward the tire equator (C) side. The outer side portion 15 extends, for example, from the first tread edge (Te1) to a point before the tire equator (C).

An angle of the outer side portion 15 of the present embodiment with respect to the tire axial direction, for example, gradually increases toward a tire axial direction inner side. The angle (θ1) of the outer side portion 15 with respect to the tire axial direction is preferably 5-45 degrees, and more preferably 5-30 degrees. Such an outer side portion 15 can also improve drainage performance during wet traveling while improving traction on snow.

The inner side portion 16 is provided on a tire axial direction inner side of the outer side portion 15. The inner side portion 16 is inclined in the same direction as the outer side portion 15. The inner side portion 16 of the present embodiment, for example, extends across the tire equator (C). However, it is also possible that the inner side portion 16 is terminated on the tire equator (C) or at a point before the tire equator (C).

An angle (θ2) of the inner side portion 16 with respect to the tire axial direction is desirably, for example, greater than the angle (θ1) of the outer side portion 15. The angle (θ2) is, for example, preferably 40-80 degrees, and more preferably 45-60 degrees. Such an inner side portion 16 can provide a snow column shearing force also in the tire axial direction when traveling on snow.

The middle portion 17 is provided between the outer side portion 15 and the inner side portion 16 and extends so as to connect the outer side portion 15 and the inner side portion 16. The middle portion 17 is inclined in an opposite direction to the outer side portion 15 and the inner side portion 16.

During traveling on snow, snow in the inclined main grooves 10 tries to move to the first tread edge (Te1) side or the tire equator (C) side due to action of a ground contact pressure. The middle portion 17 that is inclined in an opposite direction to the outer side portion 15 and the inner side portion 16 prevents such movement of the snow and thus strongly presses the snow in the groove. Therefore, a tire according to an embodiment of the present invention can gain a large snow column shearing force and thus can increase traction on snow, in particular, traction during turning.

An angle (θ3) of the middle portion 17 with respect to the tire axial direction is desirably, for example, greater than the angle (θ1) of the outer side portion 15. The angle (θ3) of the middle portion 17 is preferably 35 degrees or more and 65 degrees or less, and more preferably 45 degrees or more and 55 degrees or less. Such a middle portion 17 allows the above-described effect to be achieved while allowing the drainage performance of the inclined main grooves 10 during wet traveling to be maintained.

A length (L1) of the middle portion 17 is desirably, for example, greater than a groove width of each of the outer side portion 15 and the inner side portion 16. Such a middle portion 17 can reliably prevent movement of snow in the groove during traveling on snow and thus can strongly press the snow. The length (L1) is a distance from a first intersection point 21 between a center line of the outer side portion 15 and a center line of the middle portion 17 to a second intersection point 22 between a center line of the inner side portion 16 and the center line of the middle portion 17.

In the case of a winter tire for a passenger car, the length (L1) of the middle portion 17 is preferably 5-25 mm, and more preferably 10-20 mm. When the length (L1) is smaller than 5 mm, there is a risk that the above-described effect may be reduced. When the length (L1) is greater than 25 mm, there is a risk that the drainage performance of the inclined main grooves 10 may decrease and thus the hydroplaning phenomenon may be likely to occur.

A tire axial direction distance (L2) from the first tread edge (Te1) to the first intersection point 21 is desirably, for example, 0.25-0.40 times a tread width (TW). As illustrated in FIG. 1, the tread width (TW) is a tire axial direction distance from the first tread edge (Te1) to the second tread edge (Te2) in the normal state.

In the present embodiment, the inner side portion (16a) of a first inclined main groove 11 is connected to the middle portion (17b) of a second inclined main groove 12. The inner side portion (16b) of a second inclined main groove 12 is connected to the middle portion (17a) of a first inclined main groove 11. As a result, a large snow column can be generated at an intersecting portion of a first inclined main groove 11 and a second inclined main groove 12 and thus, excellent on-snow performance can be obtained.

Inclined sub-grooves 30 and longitudinal grooves 40 are further provided in the tread part 2.

The inclined sub-grooves 30, for example, are each provided between a pair of inclined main grooves (10, 10) that are adjacent to each other in a tire circumferential direction, and are each adjacent to inclined main grooves 10. The inclined sub-grooves 30, for example, each extend from a tread edge toward the tire equator (C) side and are each terminated at a point before the tire equator (C). The inclined sub-grooves 30 of the present embodiment include first inclined sub-grooves 31 that each extend from the first tread edge (Te1) and second inclined sub-grooves 32 that each extend from the second tread edge (Te2). The first inclined sub-grooves 31 and the second inclined sub-grooves 32 of the present embodiment have, for example, substantially line-symmetrical contours with respect to the tire equator (C).

Figure 3:
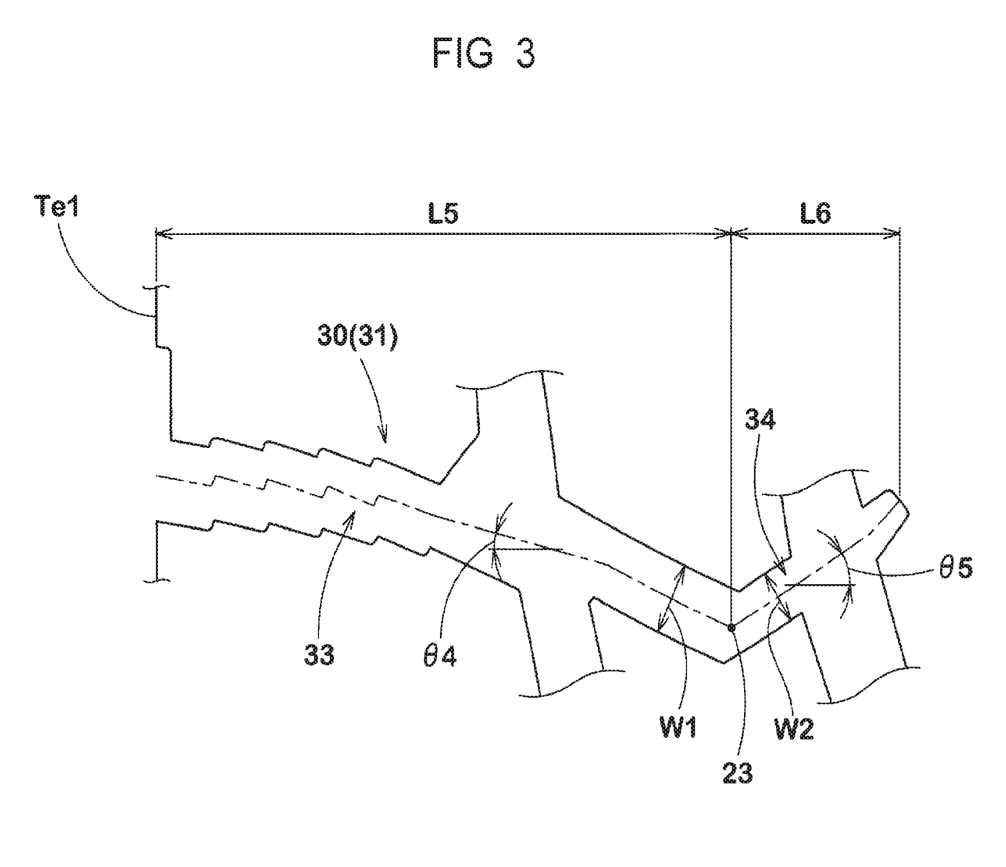
FIG. 3 is an enlarged view of a contour of a first inclined sub-groove of FIG. 1.

In FIG. 3, as a drawing for describing a structure of each of the inclined sub-grooves 30, an enlarged view of a contour of a first inclined sub-groove 31 is illustrated. As illustrated in FIG. 3, the inclined sub-grooves 30, for example, each include a first portion 33 and a second portion 34.

The first portion 33, for example, extends the outer side portion 15 of an adjacent inclined main groove 10. An angle ($\theta 4$) of the first portion 33 with respect to the tire axial direction is preferably 5-30 degrees, and more preferably 10-20 degrees.

The second portion 34, for example, extends inclined toward an opposite direction to the first portion 33. An angle ($\theta 5$) of the second portion 34 with respect to the tire axial direction is desirably, for example, 30-45 degrees. Such inclined sub-grooves 30 can each generate a firm snow column at an intersecting portion between the first portion 33 and the second portion 34.

The second portion 34 desirably has, for example, a smaller groove width than the first portion 33. Specifically, a groove width (W2) of the second portion 34 is desirably 0.65-0.80 times a groove width (W1) of the first portion 33. Such a second portion 34 helps to maintain rigidity of a land portion near the tire equator (C) and thus helps to maintain steering stability.

In order to improve steering stability on a dry road surface and on-snow performance in a well-balanced manner, a tire axial direction length (L5) of the first portion 33 is desirably, for example, 0.25-0.35 times the tread width (TW) (illustrated in FIG. 1; the same applies hereinafter). A tire axial direction length (L6) of the second portion 34 is desirably, for example, 0.10-0.15 times the tread width (TW). The length (L5) of the first portion 33 is a distance from the first tread edge (Te1) to a third intersection point 23 between a center line of the first portion 33 and a center line of the second portion 34. The length (L6) of the second portion 34 is a distance from the third intersection point 23 to an inner end of the second portion 34.

As illustrated in FIG. 1, the longitudinal grooves 40, for example, are communicatively connected to the inclined main grooves 10. The longitudinal grooves 40 include, for example, first longitudinal grooves 41 and second longitudinal grooves 42. The first longitudinal grooves 41 are provided between the first tread edge (Te1) and the tire equator (C). The second longitudinal grooves 42 are provided between the second tread edge (Te2) and the tire equator (C). The first longitudinal grooves 41 and the second longitudinal grooves 42 of the present embodiment have, for example, substantially line-symmetrical contours with respect to the tire equator (C).

Figure 4:
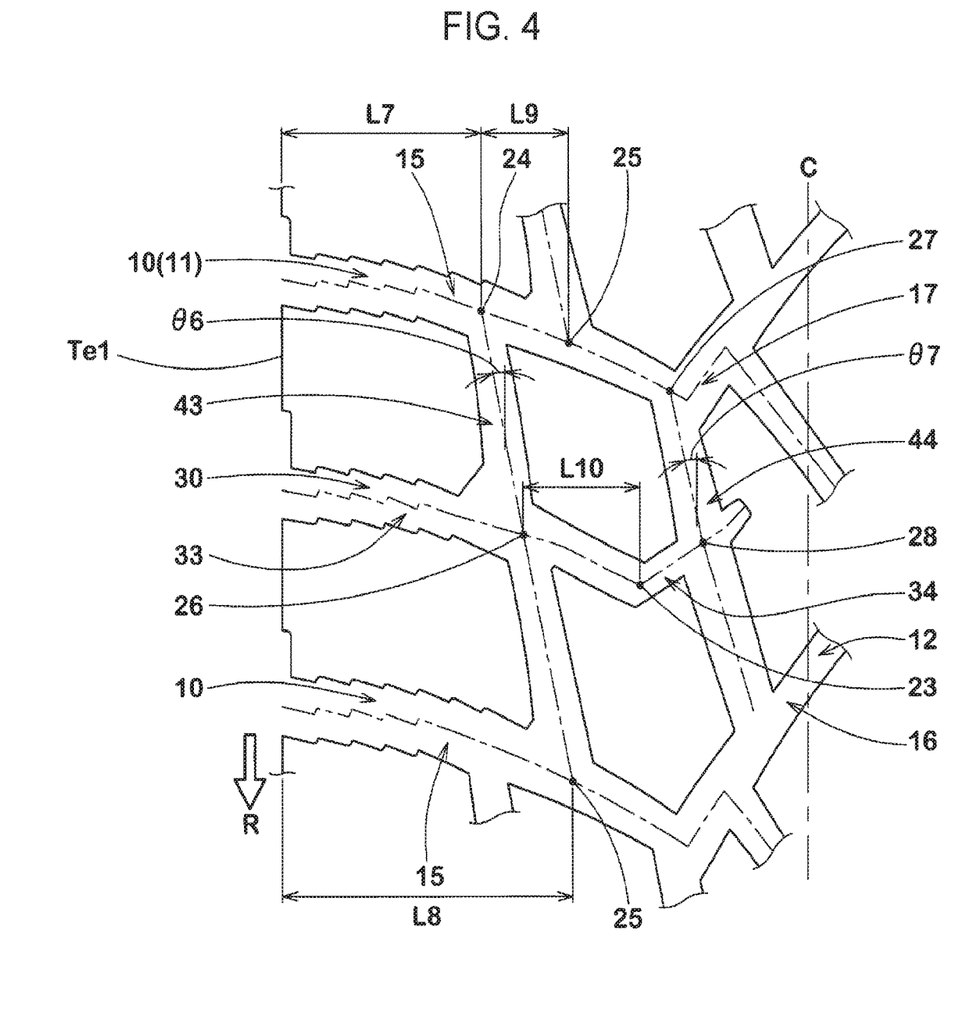
FIG. 4 is an enlarged view of a contour of a first longitudinal groove of FIG. 1.

FIG. 4 illustrates an enlarged view of a contour of a first longitudinal groove. As illustrated in FIG. 4, the first longitudinal grooves 41 include, for example, first outer side longitudinal grooves 43 and first inner side longitudinal grooves 44.

The first outer side longitudinal grooves 43, for example, each communicatively connect between the outer side portions 15 of a pair of inclined main grooves 10 that are adjacent to each other in the tire circumferential direction. The first outer side longitudinal grooves 43 of the present embodiment each intersect the first portion 33 of an inclined sub-groove 30.

Each of the first outer side longitudinal grooves 43 is desirably, for example, inclined toward the tire equator (C) side as it extends toward the rotation direction (R). An angle ($\theta 6$) of each of the first outer side longitudinal grooves 43 with respect to the tire circumferential direction is preferably 5-45 degrees, and more preferably 10-25 degrees. Such first outer side longitudinal grooves 43 can smoothly guide water to the first tread edge (Te1) side during wet traveling.

A tire axial direction distance (L7) from a fourth intersection point 24 (between a center line of a first outer side longitudinal groove 43 and a center line of a inclined main groove 10 that is adjacent to the first outer side longitudinal groove 43 on one side (upper side in FIG. 4) in the tire circumferential direction) to the first tread edge (Te1) is desirably, for example, 0.15-0.25 times the tread width (TW). A tire axial direction distance (L8) from a fifth intersection point 25 (between the center line of the first outer side longitudinal groove 43 and a center line of a inclined main groove 10 that is adjacent to the first outer side longitudinal groove 43 on the other side (lower side in FIG. 4) in the tire circumferential direction) to the first tread edge (Te1) is desirably, for example, 0.20-0.30 times the tread width (TW).

The fourth intersection point 24 and a fifth intersection point 25 of an adjacent first outer side longitudinal grooves 43 on one side (upper side in FIG. 4) in the tire circumferential direction are desirably shifted from each other in the tire axial direction. A distance (L9) between the fourth intersection point 24 and the fifth intersection point 25 is desirably, for example, 10-25 mm. Such formation of the first outer side longitudinal grooves 43 helps to generate firm snow columns at intersecting portions with the inclined main grooves 10.

A distance (L10) from a sixth intersection point 26 between a center line of a first outer side longitudinal groove 43 and a center line of an inclined sub-groove 30 to the third intersection point 23 between the first portion 33 and the second portion 34 of the inclined sub-groove 30 is preferably 5-25 mm, and more preferably 10-20 mm.

The first inner side longitudinal grooves 44 are respectively provided in tire axial direction inner sides of the first outer side longitudinal grooves 43. The first inner side longitudinal grooves 44, for example, each communicatively connect between the middle portion 17 of a first inclined main groove 11 and the inner side portion 16 of a second inclined main groove 12. The first inner side longitudinal grooves 44 of the present embodiment each intersect the second portion 34 of an inclined sub-groove 30.

The first inner side longitudinal grooves 44 are desirably inclined, for example, in the same direction as the first outer side longitudinal grooves 43. An angle ($\theta 7$) of each of the first inner side longitudinal grooves 44 with respect to the tire circumferential direction is preferably 5-25 degrees, and more preferably 10-20 degrees. Such first inner side longitudinal grooves 44 have excellent drainage performance.

A distance from a seventh intersection point 27 between a center line of a first inner side longitudinal groove 44 and a center line of an inclined main groove 10 to an eighth intersection point 28 between a center line of a first inner side longitudinal groove 44 and a center line of an inclined sub-groove 30 is desirably, for example, 10-25 mm.

As illustrated in FIG. 1, the second longitudinal grooves 42 include, for example, second outer side longitudinal grooves 45 and second inner side longitudinal grooves 46. The second outer side longitudinal grooves 45 have substantially the same structure as the first outer side longitudinal grooves 43. The second inner side longitudinal grooves 46 have substantially the same structure as the first inner side longitudinal grooves 44.

Multiple blocks 4 partitioned by the above-described multiple grooves are provided in the tread part 2. In the present embodiment, stud pins or stud pin holes 5 are respectively provided in some of the blocks 4. In the present embodiment, the stud pins or the stud pin holes 5 are randomly positioned in the blocks. Such stud pins effectively improve on-ice performance. In the drawings of the present specification, the stud pins are omitted.

In each of the blocks 4 of the present embodiment, multiple sipes 6 each extending in the tire axial direction are provided. Such sipes 6 have an excellent edge effect and improve on-ice performance. In the present specification, the term "sipe" means a slit having a width of 1.5 mm or less, which is distinguished from a groove for drainage.

The blocks 4 include, for example, multiple center blocks 51 that are provided on the tire equator (C), multiple shoulder blocks 52 that are provided closest to the tread edges, and middle blocks 53 that are provided between the center blocks 51 and the shoulder blocks 52.

Figure 5:
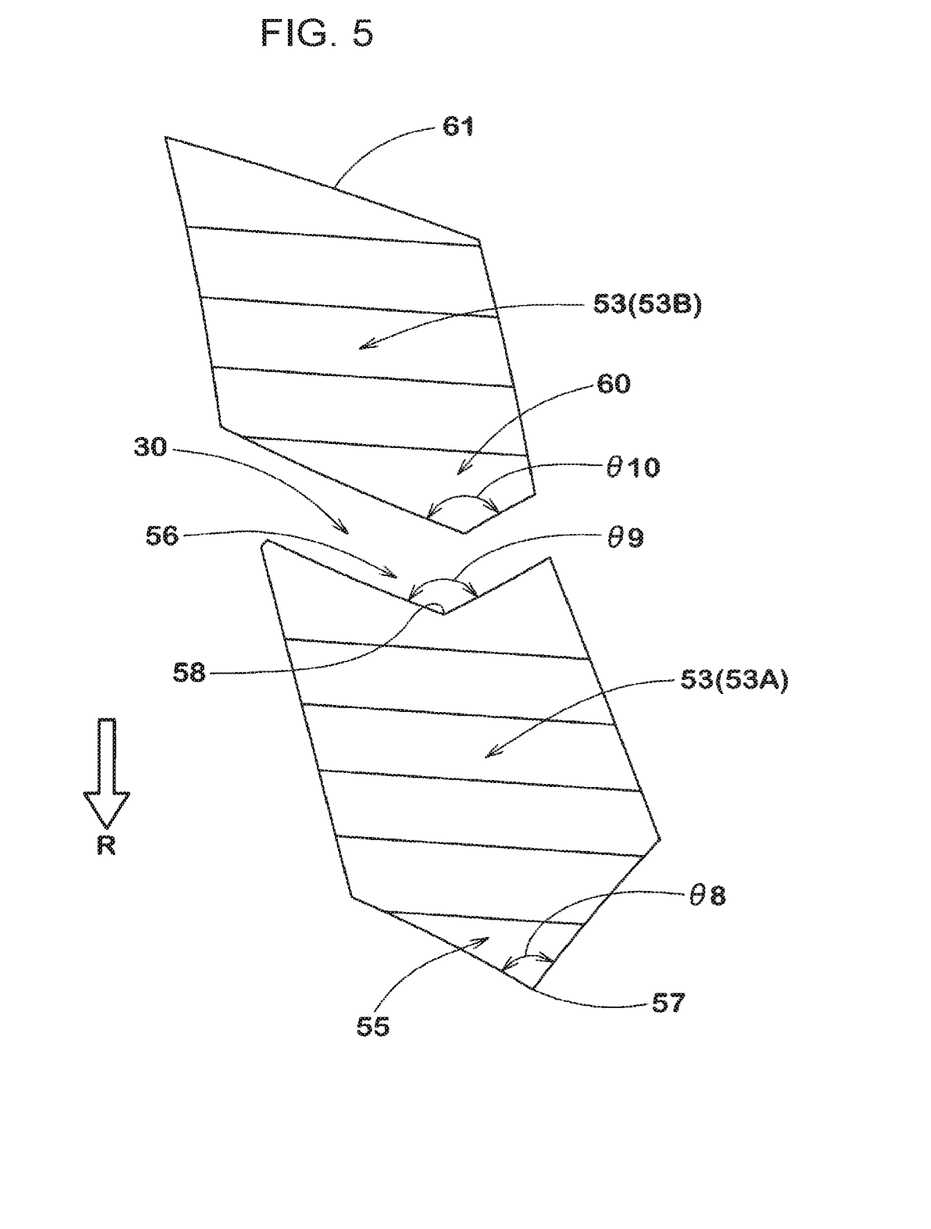
FIG. 5 is an enlarged view of middle blocks of FIG. 1.

FIG. 5 illustrates an enlarged view of the middle blocks 53. As illustrated in FIG. 5, the middle blocks 53 include, for example, first middle blocks (53A) and second middle blocks (53B). The second middle blocks (53B) are each adjacent to a first middle block (53A) on a trailing side in the tire rotation direction (R) across an inclined sub-groove 30.

The first middle blocks (53A) of the present embodiment each include, for example, a convex portion 55 that projects toward the rotation direction (R) side, and a concave portion 56 that is provided on an opposite side of the convex portion 55 and is recessed toward rotation direction (R) side. As a result, the first middle blocks (53A) each have an arrow feather-like tread surface. Such first middle blocks (53A) are easy to partially deform and thus can promote discharge of snow in the grooves and improve on-snow performance.

An angle ($\theta 8$) between edges of the convex portion 55 is desirably smaller than an angle ($\theta 9$) between edges of the concave portion 56. Such a convex portion 55 is easy to pierce on a road surface during traveling on snow and helps to improve on-snow performance. The angle ($\theta 8$) is desirably, for example, 90-100 degrees. The angle ($\theta 9$) is desirably, for example, 120-130 degrees.

An apex 58 of the concave portion 56 is desirably, for example, shifted from an apex 57 of the convex portion 55. The apex 58 of the concave portion 56 of the present embodiment is positioned on a tire axial direction outer side of the apex 57 of the convex portion 55. Such a formation of the convex portion 55 and the concave portion 56 can help to relax shear stress acting on the blocks and thus can improve durability of the blocks.

The second middle blocks (53B) each include, for example, a convex portion 60 that projects toward the rotation direction (R) side and an edge 61 that extends without bending on an opposite side of the convex portion 60. As a result, the second middle blocks (53B) each have a substantially pentagonal tread surface. Such second middle blocks (53B) are harder to fall than the first middle blocks (53A) and thus snow can be strongly pressed in the grooves between the second middle blocks (53B).

An angle ($\theta 10$) between edges of the convex portion 60 of each of the second middle blocks (53B) is desirably, for example, greater than the angle ($\theta 8$) of the convex portion 55 of each of the first middle blocks (53A). Specifically, the angle ($\theta 10$) is desirably 120-130 degrees. Such second middle blocks (53B) deform in a different manner from the first middle blocks (53A) when grounded, and thus can promote discharge of snow in surrounding grooves.

In the above, a tire according to an embodiment of the present invention is described in detail. However, without being limited to the above-described specific embodiment, the present invention can also be embodied in various modified forms.

EXAMPLES

Figure 6:
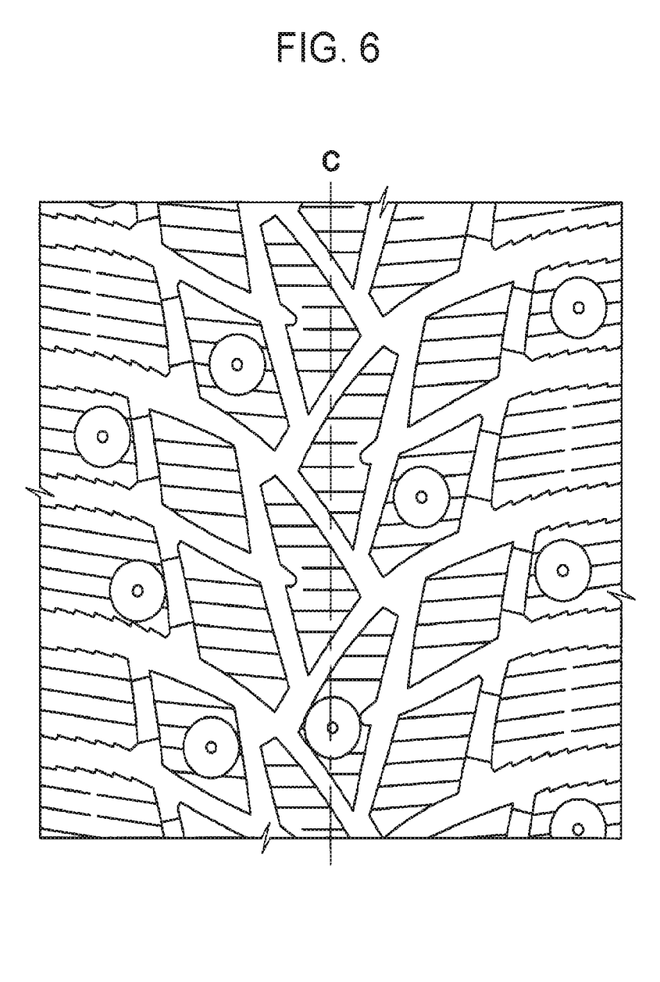
FIG. 6 is a developed view of a tread part of a tire of a comparative example.

Tires for a passenger car each having a size of 205/60R16 and the basic pattern of FIG. 1 are prototyped based on specifications shown in Table 1. As a comparative example, a tire is prototyped in which inclined main grooves entirely obliquely extend in the same direction as illustrated in FIG. 6. On-snow performance and wet performance of the test tires are tested. Specifications and a test method of the test tires are as follows.

Mounting rim: 16×6.5
Tire internal pressure: front wheel 240 kPa, rear wheel 220 kPa
Test vehicle: displacement: 2000 cc; front wheel drive car
Tire mounting positions: all wheels
Tread width (TW): 172 mm
Angle ($\theta 1$) of the outer side portion: 25 degrees
Angle ($\theta 2$) of the inner side portion: 50 degrees On-Snow Performance Driving characteristics related to traction performance, braking performance and turning performance when the test vehicle to which the test tires are mounted is driven on snow are evaluated by a driver based on sensory evaluation. The result is a score with a score of the comparative example as 100. A greater score indicates a better on-snow performance.

Wet Performance

The test vehicle is driven on an asphalt road surface having a radius of 100 m on which a puddle having a water depth of 5 mm and a length of 20 m is provided, and a lateral acceleration (lateral G) of front wheels of the test vehicle is measured. The result is an average lateral G of a speed of 50-80 km/h and is expressed as an index number with a value of the comparative example as 100. A greater index number indicates a better wet performance.

The test results are presented in Table 1.

TABLE 1

|  | Comparative Example | Example 1 | Example 2 | Example 3 | Example 4 | Example 5 | Example 6 | Example 7 |
| --- | --- | --- | --- | --- | --- | --- | --- | --- |
| Figure illustrating tread pattern | FIG. 5 | FIG. 1 | FIG. 1 | FIG. 1 | FIG. 1 | FIG. 1 | FIG. 1 | FIG. 1 |
| Angle $\theta 3$ of middle portion | — | 50 | 35 | 45 | 55 | 65 | 45 | 45 |
| Length L1 (mm) of middle portion | — | 15 | 15 | 15 | 15 | 15 | 10 | 20 |
| On-snow performance (score) | 100 | 108 | 105 | 107 | 108 | 108 | 106 | 108 |
| Wet performance (index number) | 100 | 102 | 103 | 102 | 101 | 100 | 103 | 101 |

As a result of the test, it can be confirmed that the tires of the examples have excellent on-snow performance. Further, it is confirmed that the tires of the examples also maintain good wet performance.

A tire according to an embodiment of the present invention has excellent on-snow performance based on improving a structure of the inclined main grooves.

A tire according to an embodiment of the present invention has a tread part demarcated by a first tread edge and a second tread edge. The tread part includes multiple inclined main grooves that each obliquely extend from one of the first tread edge and the second tread edge toward a tire equator side and are each terminated without reaching the other one of the first tread edge and the second tread edge. The inclined main grooves each include: a tire axial direction outer side portion that obliquely extends; a tire axial direction inner side portion that is inclined in the same direction as the outer side portion; and a middle portion that is provided between the outer side portion and the inner side portion and is inclined in an opposite direction to the outer side portion.

In a tire according to an embodiment of the present invention, it is desirable that the inclined main grooves each extend at least to the tire equator.

In a tire according to an embodiment of the present invention, it is desirable that the tread part further include inclined sub-grooves that are respectively adjacent to the inclined main grooves and each extend from one of the tread edges toward the tire equator side and are each terminated at a point before the tire equator, and the inclined sub-grooves each include a first portion that extends along the outer side portion of an adjacent inclined main groove, and a second portion that extends inclined toward an opposite direction to the first portion.

In a tire according to an embodiment of the present invention, it is desirable that the second portion has a smaller groove width than the first portion.

In a tire according to an embodiment of the present invention, it is desirable that the inclined main grooves include first inclined main grooves that each extend from the first tread edge, and second inclined main grooves that each extend from the second tread edge.

In a tire according to an embodiment of the present invention, it is desirable that the inner side portions of the first inclined main grooves are respectively connected to the middle portions of the second inclined main grooves, and the inner side portions of the second inclined main grooves are respectively connected to the middle portions of the first inclined main grooves.

The tread part according to an embodiment of the tire of the present invention includes the multiple inclined main grooves that each obliquely extend from one of the first tread edge and the second tread edge toward the tire equator side and are each terminated without reaching the other one of the first tread edge and the second tread edge. The inclined main grooves each include the tire axial direction outer side portion that obliquely extends, the tire axial direction inner side portion that is inclined in the same direction as the outer side portion, and the middle portion that is provided between the outer side portion and the inner side portion and is inclined in an opposite direction to the outer side portion.

When traveling on snow, due to action of a ground contact pressure, snow in the inclined main grooves tends to move to the tread edge sides or to the tire equator side. However, the middle portions prevent such movement of the snow and thus the snow can be strongly pressed in the grooves. Therefore, a tire according to an embodiment of the present invention can gain a large snow column shearing force and thus can increase traction on snow, in particular, traction during turning.

For example, Japanese Patent Laid-Open Publication No. 2016-016694 describes a tire in which inclined main grooves that each obliquely extend from a tread edge toward a tire equator are provided. The inclined main grooves of Japanese Patent Laid-Open Publication No. 2016-016694 are each entirely inclined in the same direction and each extend to a point near the tire equator. For such inclined main grooves, there is a problem that, when traveling on snow, snow in the grooves can easily move to the tread edge side or the tire equator side and it is difficult to strongly press the snow in the grooves.

Obviously, numerous modifications and variations of the present invention are possible in light of the above teachings. It is therefore to be understood that within the scope of the appended claims, the invention may be practiced otherwise than as specifically described herein.

What is claimed is:

1. A tire, comprising:
a tread having a first tread edge, a second tread edge on an opposite side with respect to the first tread edge, and a plurality of inclined main grooves formed such that each of the inclined main grooves is obliquely extending from one of the first tread edge and the second tread edge toward a tire equator and terminated without reaching the other one of the first tread edge and the second tread edge,
wherein the plurality of inclined main grooves includes a plurality of first inclined main grooves extending from the first tread edge, and a plurality of second inclined main grooves extending from the second tread edge and is formed such that each of the inclined main grooves includes a tire axial direction outer side portion obliquely extending in an inclined direction, a tire axial direction inner side portion inclining in the inclined direction, and a middle portion forming between the tire axial direction outer side portion and the tire axial direction inner side portion and inclining in an opposite inclined direction with respect to the inclined direction of the tire axial direction outer side portion and tire axial direction inner side portion, and the plurality of first inclined main grooves is connected to the plurality of second inclined main grooves such that the tire axial direction inner side portion of one of the first inclined main grooves is connected to the middle portion of one of the second inclined main grooves and that the middle portion of the one of the first inclined main grooves is connected to the tire axial direction inner side portion of another one of the second inclined main grooves.

2. The tire according to claim 1, wherein the plurality of inclined main grooves is formed such that each of the inclined main grooves is extending at least to the tire equator.

3. The tire according to claim 2, wherein the tread has a plurality of inclined sub-grooves formed adjacent to the inclined main grooves respectively such that each of the inclined sub-grooves is extending from a respective one of the first and second tread edges toward the tire equator and terminated at a point before the tire equator, and the plurality of inclined sub-grooves is formed such that each of the inclined sub-grooves includes a first portion extending along the tire axial direction outer side portion of an adjacent inclined main groove and a second portion extending toward and inclined in the opposite inclined direction with respect to the inclined direction of the first portion.

4. The tire according to claim 3, wherein the plurality of inclined sub-grooves is formed such that each of the inclined sub-grooves has the second portion having a groove width that is smaller than a groove width of the first portion.

5. The tire according to claim 1, wherein the tread has a plurality of inclined sub-grooves formed adjacent to the inclined main grooves respectively such that each of the inclined sub-grooves is extending from a respective one of the first and second tread edges toward the tire equator and terminated at a point before the tire equator, and the plurality of inclined sub-grooves is formed such that each of the inclined sub-grooves includes a first portion extending along the tire axial direction outer side portion of an adjacent inclined main groove and a second portion extending toward and inclined in the opposite inclined direction with respect to the inclined direction of the first portion.

6. The tire according to claim 5, wherein the plurality of inclined sub-grooves is formed such that each of the inclined sub-grooves has the second portion having a groove width that is smaller than a groove width of the first portion.

7. The tire according to claim 6, wherein the plurality of first inclined main grooves is formed such that each of the first inclined main grooves has the tire axial direction inner side portion extending across the tire equator.

8. The tire according to claim 6, wherein the plurality of first inclined main grooves is formed such that each of the first inclined main grooves has the tire axial direction inner side portion terminated before the tire equator.

9. The tire according to claim 5, wherein the plurality of first inclined main grooves is formed such that each of the first inclined main grooves has the tire axial direction inner side portion extending across the tire equator.

10. The tire according to claim 5, wherein the plurality of first inclined main grooves is formed such that each of the first inclined main grooves has the tire axial direction inner side portion terminated before the tire equator.

11. The tire according to claim 1, wherein the plurality of first inclined main grooves is formed such that each of the first inclined main grooves has the tire axial direction inner side portion extending across the tire equator.

12. The tire according to claim 11, wherein each of the inclined main grooves is formed such that the middle portion is inclined at an angle θ3 in a range of 35 degrees to 65 degrees with respect to the tire axial direction and has a length L1 in a range of 5 mm to 25 mm.

13. The tire according to claim 1, wherein the plurality of first inclined main grooves is formed such that each of the first inclined main grooves has the tire axial direction inner side portion terminated before the tire equator.

14. The tire according to claim 13, wherein each of the inclined main grooves is formed such that the tire axial direction outer side portion is inclined at an angle θ1 in a range of 5 degrees to 45 degrees with respect to a tire axial direction and that the tire axial direction inner side portion is inclined at an angle θ2 in a range of 40 degrees to 80 degrees with respect to the tire axial direction.

15. The tire according to claim 14, wherein each of the inclined main grooves is formed such that the middle portion is inclined at an angle θ3 in a range of 35 degrees to 65 degrees with respect to the tire axial direction.

16. The tire according to claim 1, wherein each of the plurality of inclined main grooves is formed such that the middle portion is inclined at an angle θ3 in a range of 35 degrees to 65 degrees with respect to the tire axial direction and has a length L1 in a range of 5 mm to 25 mm.

17. The tire according to claim 1, wherein each of the inclined main grooves is formed such that the tire axial direction outer side portion is inclined at an angle θ1 in a range of 5 degrees to 45 degrees with respect to a tire axial direction and that the tire axial direction inner side portion is inclined at an angle θ2 in a range of 40 degrees to 80 degrees with respect to the tire axial direction.

18. The tire according to claim 17, wherein each of the inclined main grooves is formed such that the middle portion is inclined at an angle θ3 in a range of 35 degrees to 65 degrees with respect to the tire axial direction.

19. The tire according to claim 18, wherein each of the inclined main grooves is formed such that the middle portion has a length L1 that is greater than a groove width of each of the tire axial direction outer side portion and the tire axial direction inner side portion, where the length L1 is a distance measured from a first intersection point between a center line of the tire axial direction outer side portion and a center line of the middle portion to a second intersection point between a center line of the tire axial direction inner side portion and the center line of the middle portion.

20. The tire according to claim 19, wherein each of the inclined main grooves is formed such that the middle portion has the length L1 in a range of 5 mm to 25 mm.

* * * * *